United States Patent
Fredriksson et al.

(10) Patent No.: US 10,969,265 B2
(45) Date of Patent: Apr. 6, 2021

(54) GAUGING INSTRUMENT INTENDED TO BE SEALINGLY MOUNTED ON A NOZZLE OF A TANK

(71) Applicant: Rosemount Tank Radar AB, Mölnlycke (SE)

(72) Inventors: Håkan Fredriksson, Linköping (SE); Peter Elmberg, Mölndal (SE); Björn Lindblad, Gothenburg (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 219 days.

(21) Appl. No.: 16/157,714

(22) Filed: Oct. 11, 2018

(65) Prior Publication Data

US 2020/0116543 A1 Apr. 16, 2020

(51) Int. Cl.
| | |
|---|---|
| *G01F 23/284* | (2006.01) |
| *F16J 15/02* | (2006.01) |
| *G01S 7/282* | (2006.01) |
| *G01S 13/88* | (2006.01) |
| *H01Q 1/22* | (2006.01) |
| *G01S 7/02* | (2006.01) |
| *G01S 13/00* | (2006.01) |

(52) U.S. Cl.
CPC .......... *G01F 23/284* (2013.01); *F16J 15/022* (2013.01); *G01S 7/282* (2013.01); *G01S 13/88* (2013.01); *H01Q 1/225* (2013.01); *G01S 2007/027* (2013.01)

(58) Field of Classification Search
CPC ....... G01F 23/284; F16J 15/022; G01S 7/282; G01S 13/88; G01S 2007/027; H01Q 1/225

See application file for complete search history.

(56) References Cited

U.S. PATENT DOCUMENTS

| | | |
|---|---|---|
| 4,566,321 A | 1/1986 | Zacchio |
| 4,670,754 A | 6/1987 | Zacchio |

(Continued)

FOREIGN PATENT DOCUMENTS

| | | |
|---|---|---|
| CN | 207937034 | 10/2018 |
| WO | WO 03/078936 | 9/2003 |
| WO | WO 2019/086524 | 5/2019 |

OTHER PUBLICATIONS

European Search Report from European Patent Application No. 19202173.1, dated Mar. 10, 2020.

*Primary Examiner* — Bernarr E Gregory
(74) *Attorney, Agent, or Firm* — Westman, Champlin & Koehler, P.A.

(57) ABSTRACT

A gauging instrument intended to be sealingly mounted on a nozzle of a tank, and comprising an attachment collar intended to mate with said nozzle so as to face the product in the tank, a dielectric filling member with a radially extending collar portion which abuts an outer rim of said attachment collar, and an annular spring element arranged between the outer rim the radially extending collar portion. One or several fastening elements are configured to secure the attachment collar to, and in mating relationship with, the nozzle, such that the radially extending collar portion is sandwiched between the outer rim of the attachment collar and the nozzle, and the annular spring element exerts a contact pressure on the collar portion against the nozzle to thereby ensure a process seal.

8 Claims, 5 Drawing Sheets

(56) References Cited

U.S. PATENT DOCUMENTS

| | | | | |
|---|---|---|---|---|
| 5,507,181 A | * | 4/1996 | Fox | G01F 23/284 |
| | | | | 73/290 V |
| 6,148,681 A | * | 11/2000 | Gravel | G01F 23/284 |
| | | | | 73/866.5 |
| 6,276,199 B1 | | 8/2001 | Eckert et al. | |
| 7,602,330 B2 | | 10/2009 | Serban et al. | |
| 8,482,296 B2 | * | 7/2013 | Reimelt | G01F 23/284 |
| | | | | 324/644 |
| 9,000,775 B2 | | 4/2015 | Chen et al. | |
| 2002/0126061 A1 | * | 9/2002 | Griessbaum | G01F 23/284 |
| | | | | 343/786 |
| 2014/0266862 A1 | * | 9/2014 | Fredriksson | G01F 23/284 |
| | | | | 342/124 |
| 2017/0141474 A1 | | 5/2017 | Hengstler et al. | |
| 2018/0113020 A1 | * | 4/2018 | Fredriksson | G01F 23/284 |
| 2019/0128728 A1 | | 5/2019 | Fredriksson | |

\* cited by examiner

GAUGING INSTRUMENT INTENDED TO BE SEALINGLY MOUNTED ON A NOZZLE OF A TANK

FIELD OF THE INVENTION

The present invention relates to a gauging instrument intended to be sealingly mounted on a nozzle of a tank, for determining a process variable relating to a product in said tank.

BACKGROUND OF THE INVENTION

Various gauging instruments are used in applications where it is required to provide satisfactory sealing of the tank or container on which the instrument is mounted. Such sealing is typically referred to as a "process seal".

In some applications, the process seal is provided by an annular sealing element, sometimes referred to as a gasket, sandwiched between an annular opening of the instrument and an annular opening on which the instrument is mounted (e.g. a tank flange).

One specific type of gauging instrument is a radar level gauge (RLG), which suitably is used for making measurements of a filling level of products such as process fluids, granular compounds and other materials contained in a tank. Radar level gauges are used in various applications, including hygienic applications, where the requirements on the process seal are especially high.

An example of such a radar level gauge can include transceiver circuitry for transmitting and receiving microwaves, a directional antenna arranged to direct microwaves towards the surface and to return microwaves reflected by the surface to the transceiver, and processing circuitry adapted to determine the filling level based on a relation between microwaves transmitted and received by the transceiver. The antenna may be adapted to a specific frequency band. The currently most used frequency bands have center frequencies of around 6 GHz or 24 GHz, although higher frequency bands may also be contemplated. A dielectric filling member may be arranged in the cavity of the antenna and/or the wave guide, in order to protect the waveguide/antenna from thermal and chemical influence from the tank atmosphere.

Such a dielectric filling member should be transmissive to microwaves, chemically resistant, preferably hydrophobic (repelling to water), and also needs to withstand temperatures and pressure which are present in the tank. Some applications, known as high-pressure, high temperature (HPHT) applications, present especially challenging conditions. One material which is often used for such filling members is polytetrafluoroethylene (PTFE), also known as TEFLON®.

In some examples, the dielectric filling member includes a radially extending collar, which may serve as the annular sealing element, and be sandwiched between an opening of the gauge (e.g. the outer opening of a tank connection also defining the antenna) and the rim of the tank nozzle.

There are several challenges with an annular process seal or gasket. Most importantly, suitable materials, such as PTFE, will typically "creep", i.e. be deformed due to pressure and temperature. If this happens, the sealing function of the gasket may deteriorate, and gaps may form allowing contents to escape or be contaminated.

Material creeping of a sealing gasket is especially problematic in situations where the mounting of the instrument is ensured by an annular clamp, such as a tri-clamp, which may be more difficult to adjust correctly.

GENERAL DISCLOSURE OF THE INVENTION

It is an object of the present invention to provide a gauging instrument with an improved process seal.

According to a first aspect of the present invention, this and other objects are achieved by a gauging instrument intended to be sealingly mounted on a nozzle of a tank, for determining a process variable relating to a product in the tank, the gauging instrument comprising an attachment collar intended to mate with the nozzle so as to face the product in the tank, a dielectric filling member arranged in the attachment collar and having a radially extending collar portion which abuts an outer rim of the attachment collar, the dielectric filling member being substantially impermeable to the product and any further tank contents, an annular spring element arranged between the outer rim of the attachment collar and the radially extending collar portion, and one or several fastening elements configured to secure the attachment collar to, and in mating relationship with, the nozzle, such that, when the attachment collar is secured to the nozzle, the radially extending collar portion is sandwiched between the outer rim of the attachment collar and the nozzle, and the annular spring element exerts a contact pressure on the collar portion against the nozzle to thereby ensure a process seal.

With this design, the annular spring element ensures that the radially extending collar portion, which serves as a sealing gasket, is pressed against the tank nozzle with a well-defined contact pressure so as to seal the tank. This pressure may counteract any deformation of the collar portion (sometimes referred to as "creeping"), especially in a situation where the fastening element(s) may not be easily adjusted with satisfactory precision.

It is important to note that the annular spring element itself does not contribute to the tank sealing, as it is located on the exterior side of the collar portion (i.e. not facing the tank interior). Instead, the function of the annular spring element is to be resiliently compressed and thereby ensure a satisfactory pressure on the collar portion against the tank nozzle.

One type of instrument, in which the invention is particularly advantageous, is a radar level gauge arranged to determine a filling level of the product in the tank. An RLG conventionally comprises a transceiver configured to generate and transmit electromagnetic signals, an antenna arranged to direct an electromagnetic transmit signal transmitted by the transceiver towards the surface of the product and to return back to the transceiver an electromagnetic surface reflection signal resulting from reflection of the electromagnetic transmit signal at the surface, and processing circuitry connected to the transceiver for determining the filling level based on the electromagnetic surface reflection signal. In this case, the dielectric filling member is arranged in the antenna, which forms the attachment collar. The filling member must therefore be permeable to electromagnetic signals.

The invention is particularly advantageous when the gauging instrument is mounted by means of an annular clamp, e.g. a tri-clamp, held together by one or several tangential screws. Such a clamp makes it difficult to precisely adjust the pressure on the collar portion to prevent leakage. With the present invention, the string element will provide a better control of the pressure on the collar portion.

The spring element may be an O-ring, a c-ring, a coil spring, a disc spring, a Belleville washer, or any other annular element which may be resiliently compressed.

The attachment collar may include a groove for receiving the annular spring element. Such a groove may secure the spring element in its position, and thus contribute to a well-defined contact pressure.

Alternatively, the annular spring element is received in a space formed between an axial step in the radially extending collar portion and a rim of the attachment collar. Again, this ensures fixation of the spring element to ensure its function.

Parts of the dielectric filling member which are intended to face an interior of the tank are preferably made of a polymer material, such as PTFE.

BRIEF DESCRIPTION OF THE DRAWINGS

The present invention will be described in more detail with reference to the appended drawings, showing currently preferred embodiments of the invention.

FIG. 1a is a schematic view of a radar level gauge according to an embodiment of the present invention, mounted on a tank.

FIG. 1b is a schematic block diagram of some parts of the radar level gauge in FIG. 1a.

DETAILED DESCRIPTION OF PREFERRED EMBODIMENTS

Embodiments of the present invention will herein be described with reference to a radar level gauge. However, it will be understood that the invention will be equally applicable also for other gauging instruments where an attachment collar is sealingly mounted on a tank nozzle.

A radar level gauge (RLG) 1 according to an embodiment of the present invention is illustrated schematically in FIGS. 1a and 1b. The RLG 1 is mounted on a tank 2, and arranged to perform measurements of a process variable such as the level L of an interface between two materials in the tank 2. Typically, the first material is a product 4 stored in the tank, e.g. a liquid such as gasoline, or a solid such as a granular compound, the second material is air or other atmosphere 5 in the tank, while the interface is the surface 3 of the product 4. In some applications, the tank is a very large metal tank (diameter in the order of ten meters).

Figure 1:
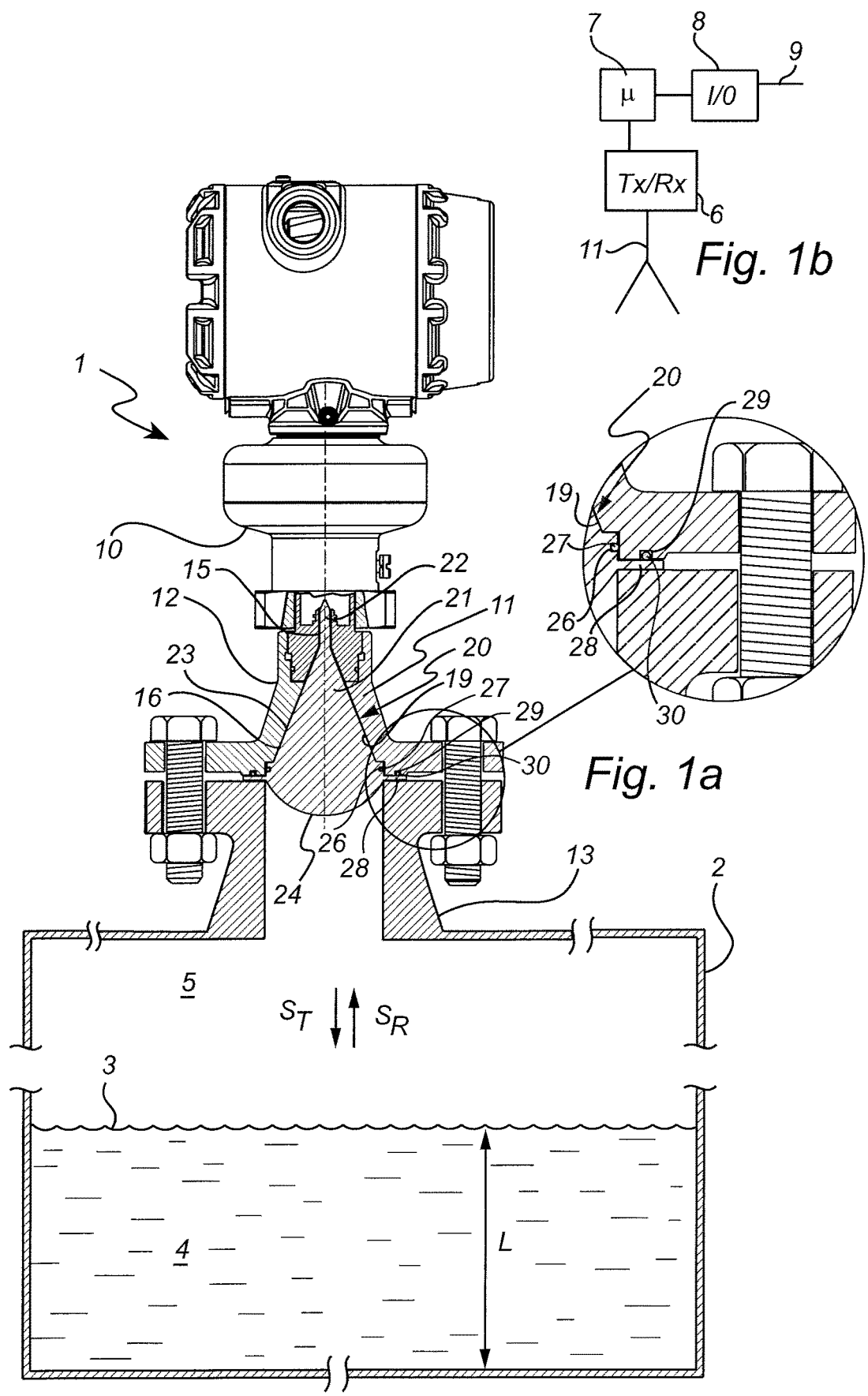

The radar level gauge 1 includes transceiver circuitry 6, processing circuitry 7 and an interface 8, illustrated very schematically in FIG. 1. The RLG circuitry, i.e. the transceiver circuitry 6, processing circuitry 7 and a signal/power circuitry 8, is arranged in a measurement unit (MU) 10 mounted to an annular attachment collar, also referred to as a tank connection 12, made of a metal material, typically steel, which is adapted to be securely fitted (e.g. bolted or welded) to a tank nozzle 13. The tank connection 12 is adapted to provide a passage (preferably pressure sealed) for electromagnetic signals through the wall of the tank, which passage connects the transceiver circuitry 6 with a signal propagation device, here a directional antenna in the form of an antenna horn 11 formed by the tank connection 12. The antenna 11 is arranged to act as an adapter, transmitting free propagating electromagnetic waves into the tank 2 to be reflected by the interface, here the surface 3 of the product 4 in the tank 2. An RLG with a directional antenna is often referred to as a non-contact radar (NCR) level gauge.

The antenna 11 comprises a waveguide section 15 and a horn section 16. A coupling arrangement, such as a probe (not shown), is arranged to couple the transmit signal from the transceiver into the waveguide section. The transmit signal will then be allowed to propagate to the horn section and then be emitted into the tank. Conversely, the return signal will be received by the antenna horn section and allowed to propagate through the waveguide section and be coupled back to the transceiver by the coupling arrangement.

The transceiver circuitry 6 is configured to generate and transmit an electromagnetic (microwave) transmit signal ST and receive an electromagnetic (microwave) return signal SR. The transmit signals ST are propagated towards the surface 3 of the product 4 by the signal propagation device, in this case the antenna 11. The electromagnetic return signals SR are caused by a reflection in the surface 3, and are returned by the signal propagation device (antenna 11) and fed back to the transceiver 6. The transceiver circuitry 6 may be one functional unit capable of transmitting and receiving electromagnetic signals, or may be a system comprising separate transmitter and receiver units. The elements of the transceiver circuitry 6 are typically implemented in hardware, and form part of an integrated unit normally referred to as a microwave unit. For simplicity, the transceiver circuitry is referred to as the "transceiver" in the following description.

The processing circuitry 7 may include a combination of analogue processing realized in hardware, and digital processing realized embodied by software modules stored in a memory and executed by an embedded processor. The invention is not restricted to the particular realization, and any implementation found suitable to realize the herein described functionality may be contemplated.

The processing circuitry 7 is configured to determine the distance between a reference position at the top of the tank (such as the passage between the outside and the inside of the tank) and the surface 3 by analyzing the transmit signal ST and the return signal SR. The processing typically includes generation of a tank signal or "echo curve", including a plurality of peaks representing echoes from the interior of said tank. One of the peaks represent an echo from the surface 3. Based on the determined distance to the surface 3, generally referred to as ullage, and known dimensions of the tank 5, a process variable such as the filling level L of the tank can be deduced.

The interface 8 is configured to allow communication of a measurement value externally of the RLG and optionally for power supply of the RLG. For example, the interface 8 may be a two-wire control loop 9, such as a 4-20 mA loop. The interface 8 may also include a serial data bus, allowing communication using a digital communication protocol. Examples of available digital protocols include HART, Modbus, Profibus and Foundation Fieldbus. The interface 8 may also be a wireless interface, employing e.g. wireless HART, in which case the RLG is provided with some sort of internal energy store, such as a battery 17, possibly solar powered.

The transmit signal is here a high frequency signal, with an operating frequency range greater than 1 GHz. Typically, the operating frequency range is centered around 6 GHz or 26 GHz, with a band-width of one or several GHz.

According to one measuring principle, the transmit signal is a continuous signal with varying frequency (frequency modulated continuous wave, FMCW). An FMCW based RLG will emit a radar sweep with gradually varying frequency, and mix the received signal with the original signal (homodyne mixing) to form a frequency domain tank signal.

According to another measurement principle, the transmit signal is a train of distinct pulses with a duration in the order of ns and a repletion frequency in the order of MHz. The return signal is sampled with the original pulse train in a sample and hold circuit in a process known as time domain reflectometry (TDR), thereby forming a time domain tank signal. When time domain reflectometry is used in a NCR level gauge, the pulses need to be frequency modulated to allow emission with the directional antenna.

The transmit signal may also be some combination of FMCW and a pulsed signal. For example, a principle known as multiple frequency pulsed wave (MFPW) has been proposed.

A microwave transmissive dielectric filling member 20 is arranged at least partly within the cavity 19 formed by the waveguide section 15 and the horn section 16. The filling member 20 serves to protect the antenna horn against thermal and chemical impact of the tank atmosphere 5. The filling member 20 is preferably made of a chemically resistant and water repellant material, such as a fluoropolymer. In the present example, the polymer material is PTFE, chosen for its temperature resistance.

The filling member 20 here has a cylindrical portion 22 adapted to fit in the waveguide section 16, and a conical portion 23 adapted to fit in the horn section 17. The base 24 of the conical portion, i.e. the surface facing the interior of the tank, may have a convex shape in order to shape the radar beam of emitted waves in a beneficial manner.

The filling member 20 may be provided with a groove 26 extending around the periphery of the conical portion 22. The groove is adapted to receive an annular element 27, such as an O-ring, which may serve to mechanically fixate the filling member 20 in the cavity 19.

In order to provide a tank seal, i.e. to prevent tank content from escaping, the filling member 20 is further provided with an annular collar portion 28, in this case protruding from where the convex base 24 meets the conical portion 23. The collar portion 28, also referred to as a gasket, is sandwiched between the tank connection 12 and the tank nozzle 13 to thereby seal the tank 2.

In the area facing the gasket 28, the tank connection 12 is here provided with a groove 29, in which an annular spring element 30 is arranged. The spring element 30 will ensure that a well-defined contact pressure is exerted on the gasket 28, thereby ensuring a reliable sealing of the tank. The spring element 30 is here illustrated as a resiliently compressible O-ring, but may alternatively be e.g. a disc spring or a Belleville washer.

The tank connection 12 which forms the antenna horn 11 is mounted to the tank nozzle 13 by means of bolts 31, such that the spring element is compressed, and thus exerts a contact pressure on the gasket 28 against the rim of the nozzle 13.

FIGS. 2 and 3a-c schematically how an attachment collar 112 of an instrument such as a radar level gauge instead can be mounted to a tank nozzle 113 by means of an annular clamp 101, here a so called tri-clamp. Such mounting is typically more common in protected environments, such as for industrial process instruments and the like. It is noted that the attachment collar 112 may belong to a radar level gauge similar in design and operation to that disclosed in FIG. 1 and described above. However, the attachment collar 112 is more slender than the tank connection 12 in FIG. 1.

If the instrument is a radar level gauge, the attachment collar 112 may simply be an antenna horn of the radar level gauge.

Figure 2:
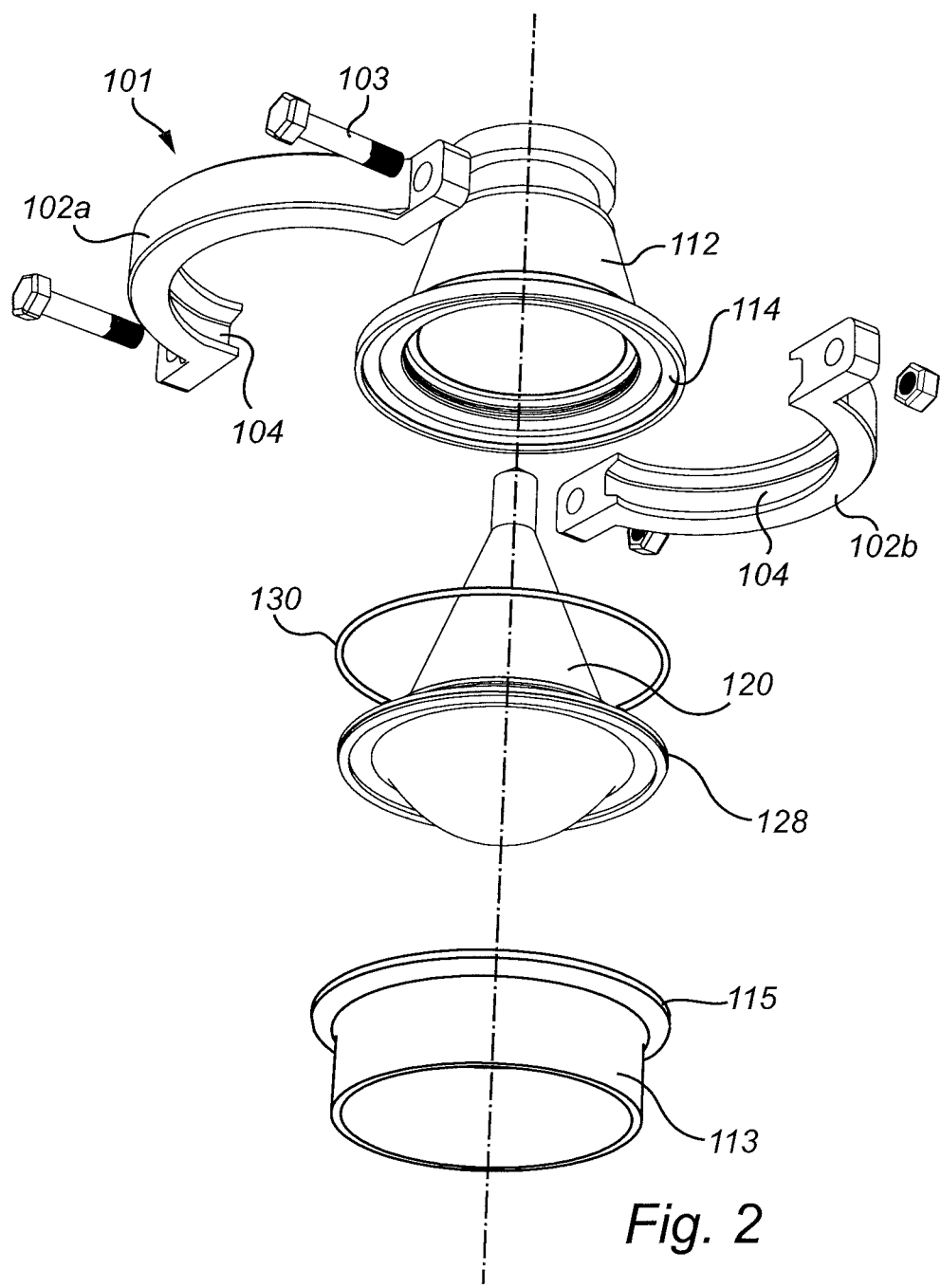
FIG. 2 is an exploded perspective view of how a tank connection of an instrument can be secured to a tank nozzle using a clamping device.

With reference to FIG. 2, the annular clamp 101 here has two, substantially semicircular elements 102a, 102b, which are held together by two bolts 103 acting in a tangential direction. In other examples the annular clamp is divided into more than two sections, e.g. three sections which together form the annular ring. Also, one or more of the sections may be joined by hinges instead of bolts. For example, the illustrated example, one of the bolts 103 may be replaced by a hinge.

A tapered groove 104 in the elements 102a and 102b engages the outer rims 114, 115 of the attachment collar 112 and tank nozzle, respectively. When the clamp 101 is secured by tightening the bolts 103, the annular clamp 101 ensures a fixed position of the annular opening of the attachment collar 112 with respect to the annular opening of the tank nozzle 113. A sealing gasket 128, here an annular collar of a dielectric filling member 120, is sandwiched between the rim 114 of the attachment collar 112 and the rim 115 of the nozzle 113.

An annular spring element 130, here an O-ring, is arranged between the rim 114 of the attachment collar 112 and the sealing gasket 128. Similar to the spring element 30 in FIG. 1, the spring element 130 will ensure that a well-defined contact pressure is exerted on the gasket 128 when the clamp 101 is secured.

Figure 3A:
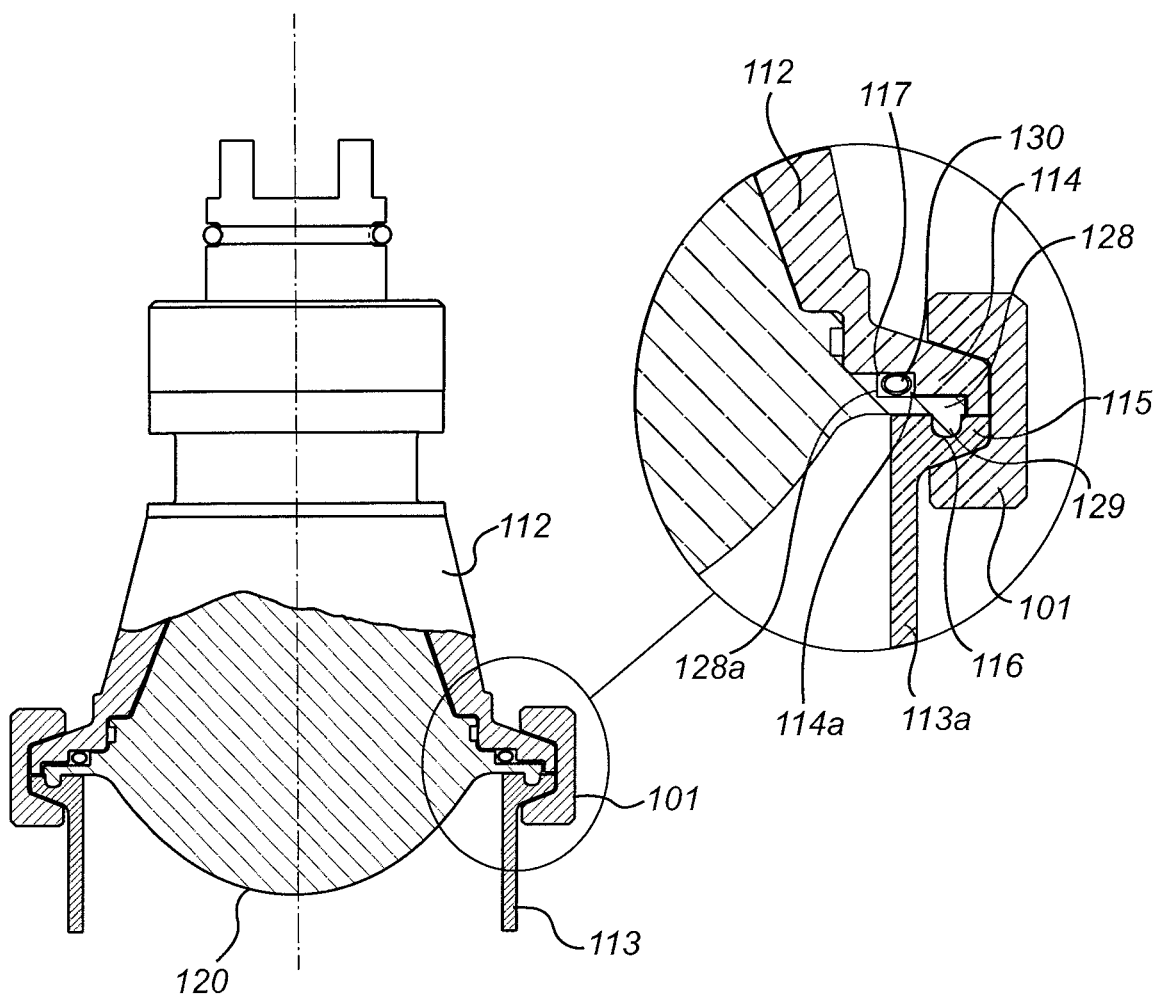
FIGS. 3a-c are more detailed cross-section views of three examples of the invention applied in a clamping device.
Figure 3B:
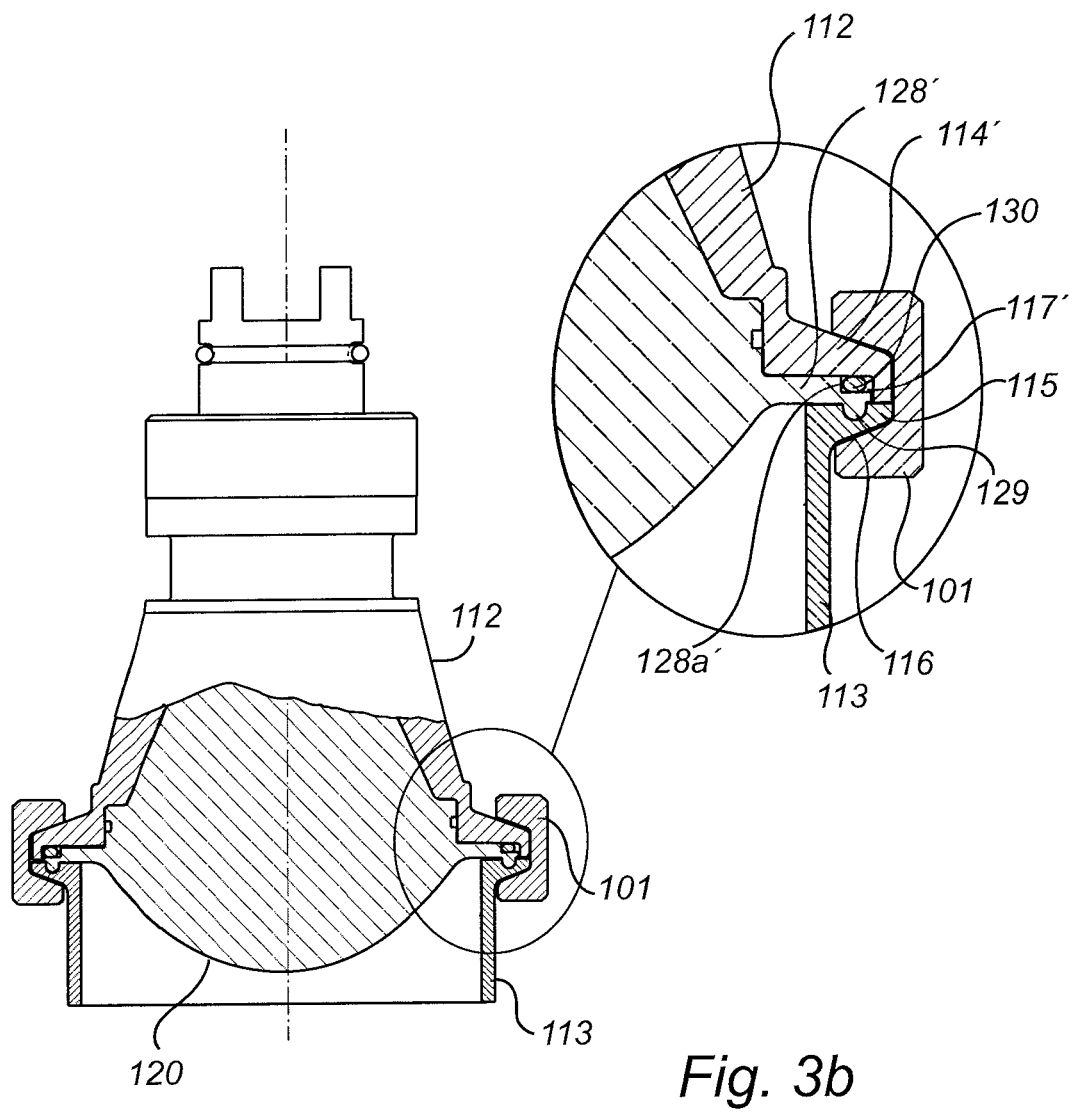
Figure 3C:
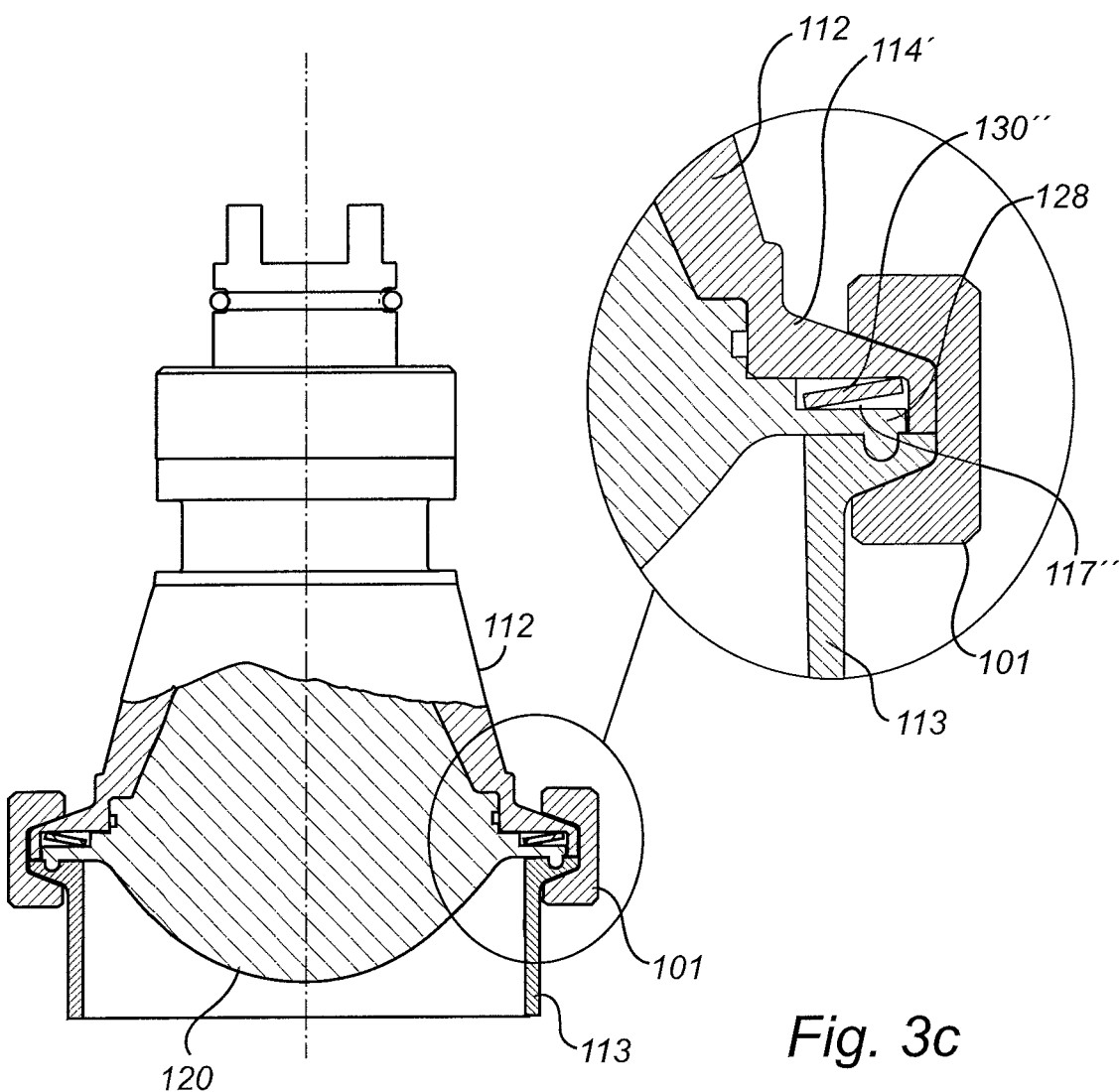

Turning to FIGS. 3a-c, the clamp 101 is shown in its secured state, and the details of the gasket 128 and spring element 130 have been enlarged.

In the example in FIG. 3a, the gasket 128 (i.e. the annular collar of the dielectric filling member 120) is provided with a downwardly extending annular protrusion 129, which is received by a corresponding groove 116 in the rim 115 the tank nozzle 113. The radially extending gasket 128 is provided with an axial step 128a, at a distance radially inside a corresponding step 114a in the rim 114. An annular space 117 is formed between the steps 128a and 114a, in which space 117 the spring element 130 is arranged. The space 117 is here located approximately above the side wall 113a of the tank nozzle 113, such that pressure exerted by the spring element 130 in its compressed state will be received by the wall 113a.

In the example in FIG. 3b, the gasket 128' again has a downwardly extending annular protrusion 129 received in groove 116. And again, the gasket 128' is provided with an axial step 128a'. Here, however, the axial step 128a' is located radially closer to the outer edge of the rim 114'. An annular space 117' is here formed between the step 128a' and the outer edge of the rim 114', in which space 117' the spring element 130 is arranged.

In the example in FIG. 3c, finally, the gasket 128 is similar to the gasket 128 in FIG. 3a, while the rim 114' of the attachment collar 112 is similar to the rim in FIG. 3b. As a result, a space 117" which is wider in the radial direction is formed between the step 128a and the outer edge of the rim 114'. In this wider space 117" is arranged s spring element 130" in the form of a disc spring or Belleville washer 130".

The person skilled in the art realizes that the present invention by no means is limited to the preferred embodiments described above. On the contrary, many modifications and variations are possible within the scope of the appended claims. For example, the shape and proportions of the dielectric filling member may be different, depending on the shape and proportions of the antenna cavity. In particular, the horn section may be smaller, resulting in a relatively longer waveguide section, which affects the shape of the filling member. Further, as mentioned above, the invention may also be implemented in instruments without any antenna horn, but with some other type of annular attachment collar. For example, the pressure gauges and ultrasonic gauges may have an annular attachment collar.

What is claimed is:

1. A radar level gauge configured to be sealingly mounted on a nozzle of a tank, for determining a filling level of a product in said tank, said radar level gauge comprising:
    a transceiver configured to generate and transmit electromagnetic signals;
    an antenna electrically connected to said transceiver and arranged to direct an electromagnetic transmit signal towards a surface of the product and to receive an electromagnetic surface reflection signal resulting from reflection of said electromagnetic transmit signal at said surface; and
    processing circuitry connected to said transceiver for determining said filling level based on a relationship between said electromagnetic transmit signal and said electromagnetic surface reflection signal;
    an outer rim of said antenna being configured to mate with said nozzle so as to face the product in the tank;
    a dielectric filling member which is permeable to said electromagnetic signals, wherein said dielectric filling member is arranged in said antenna and having a radially extending collar portion which abuts the outer rim of said antenna, said dielectric filling member being substantially impermeable to the product and any further tank contents;
    an annular spring element arranged between the outer rim of the antenna and the radially extending collar portion;
    one or several fastening elements configured to secure the antenna to, and in mating relationship with, said nozzle, such that, when said antenna is secured to the nozzle, the radially extending collar portion is sandwiched between the outer rim of the antenna and the nozzle, and the annular spring element exerts a contact pressure on the collar portion against the nozzle to thereby ensure a process seal.

2. The gauging instrument according to claim 1, wherein the fastening element/elements includes/-include an annular clamp.

3. The radar level gauge according to claim 1, wherein said outer rim of the antenna includes a groove for receiving said annular spring element.

4. The radar level gauge according to claim 1, wherein the annular spring element is received in a space formed between an axial step in the radially extending collar portion and the outer rim of the antenna.

5. The gauging instrument according to claim 1, wherein the annular spring element is an O-ring, a c-ring or a coil spring.

6. The gauging instrument according to claim 1, wherein parts of said dielectric filling member which in use face an interior of the tank are made of a polymer material.

7. The gauging instrument according to claim 6, wherein said polymer material is a fluoropolymer.

8. The gauging instrument according to claim 6, wherein said polymer material is polytetrafluoroethylene, PTFE.

* * * * *